United States Patent

[11] 3,630,322

| [72] | Inventors | James L. Keely<br>Wayzata;<br>Larry D. Quanrud, Minneapolis, both of Minn. |
|---|---|---|
| [21] | Appl. No. | 58,253 |
| [22] | Filed | July 27, 1970 |
| [45] | Patented | Dec. 28, 1971 |
| [73] | Assignee | Washington Scientific Industries Inc.<br>Long Lake, Minn. |

[54] DYNAMIC BRAKE
4 Claims, 4 Drawing Figs.

[52] U.S. Cl. .......................................................... 188/135,
188/77 W, 242/156
[51] Int. Cl. .......................................................... B60t 7/12
[50] Field of Search .......................................... 188/77 W,
134, 135, 166, 180, 186; 192/8 C; 242/84.5 R,
88.52 A, 88.52 C, 99, 156, 156.2

[56] References Cited
UNITED STATES PATENTS

| 1,260,650 | 3/1918 | Cook | 188/134 UX |
| 2,514,264 | 7/1950 | Soper | 242/156 X |
| 2,598,387 | 5/1952 | Hunsicker | 188/135 X |

*Primary Examiner*—Duane A. Reger
*Attorneys*—Thomas D. Devine and Lew Schwartz

ABSTRACT: A dynamic-braking apparatus adapted to halt film movement in a microfilm viewer such that individual film frames may be easily selected. Particularly useful at high-film speeds, this braking apparatus comprises a pulley to receive braking torque and a weight which is connected to the pulley by a torsion spring. The braking force on the pulley is opposed by the inertial force of the weight, causing end displacement of the spring, resulting in its contraction and its transmission of braking torque to the shaft from which the film is being fed. The degree and rate of brake torque transmission are further controlled by means of a further connection between the pulley and the weight which allows only limited relative movement between the parts. Compression springs are provided to prevent "noise" and to insure return of the torsion spring to an equilibrium position.

PATENTED DEC 28 1971 3,630,322

INVENTORS
LARRY D. QUANRUD,
JAMES L. KEELY
BY
Thomas G. Devine
ATTORNEY

DYNAMIC BRAKE

BACKGROUND OF THE INVENTION

It is generally desirable in the operation of microfilm viewers that a particular film frame be found and brought into view within a relatively short period of time, thus requiring high film speeds for must efficient use of the viewer. One serious limitation, in the prior art, on the film speed has been the lack of adequate means for stopping the film. Prior art means such as constant metal contact or applied braking contact to brakeshoe material have generally led to inaccurate frame selection and film accumulation or pileup outside the reels such that the film must be rethreaded.

Not only does this invention provide a rapid and accurate means of frame selection, it also prevents loss of film tension by only providing braking in the lagging film reel. Selection of a particular stopping speed may be accomplished by selection of a spring with appropriate stiffness.

SUMMARY OF THE INVENTION

The apparatus of this invention comprises a pulley which receives braking torque connected to one end of a torsion spring which is coiled around a shaft and then connected to a weight on the other end. Preferably, the pulley is further connected to the weight to limit relative movement between the two, and compression springs are provided to prevent locking of the torsion spring in an engaged position and to reduce contact noise.

Therefore, an object of this invention is to provide extremely high speed across to a selected one of many film frames.

Another object is to provide very fast braking of a lagging reel.

Still another object is to prevent film from spilling out of the lagging reel.

Another object is to prevent damage to the film.

Other objects will be obvious when the detailed description and claims are read.

DESCRIPTION OF THE PREFERRED EMBODIMENT

Figure 1:
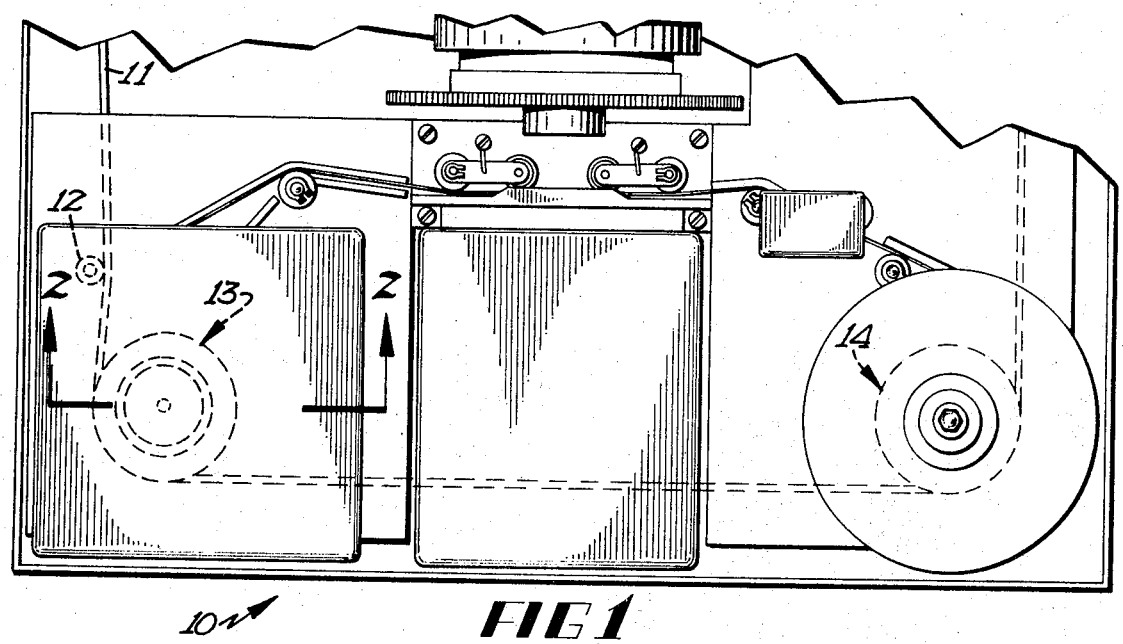
FIG. 1 is a top plane view of a portion of a microfilm view illustrating the interrelationship of the various components of the driving system.
Figure 2:
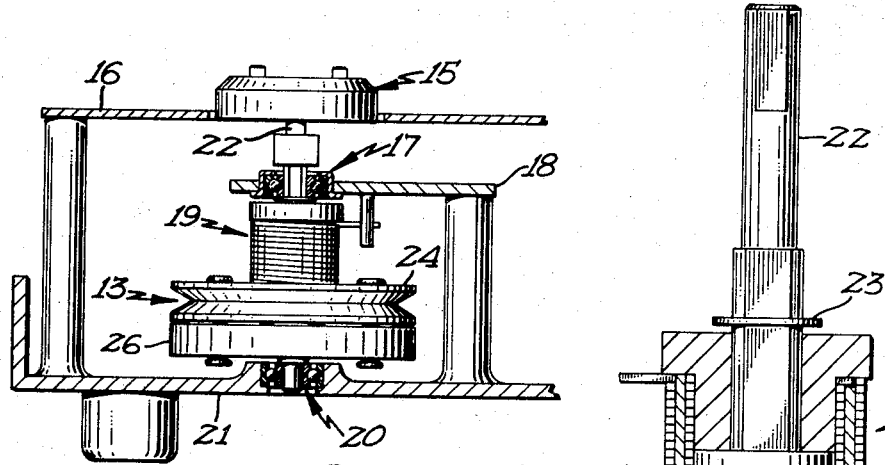
FIG. 2 is a front plan view of the supply side of the microfilm viewer with the front of the frame removed exposing the spindle drive assembly.

FIG. 1 shows a microfilm viewer 10 and indicates the general interrelationship between the various driven components of the drive train. Motor-driven belt 11 transmits braking torque to the supply braking apparatus 13 and to the takeup side braking apparatus 14. Apparatus 13 and apparatus 14 are capable of transmitting braking torque in opposite rotational directions resulting from use of torsion springs discussed below which are coiled in opposite rotational directions. Braking apparatus 13 is shown in FIG. 2 together with other components of the supply driving system to indicate the interrelationship of these components with braking apparatus 13. Supply reel spindle 15 is shown as rotatably mounted on floor panel 16 to shaft 22. Shaft 22 is secured by means of top bearing assembly 17 wit bearing support 18 and bottom bearing assembly 20 with frame floor 21. Clutch assembly 19 is shown as mounted on shaft 22 directly above braking apparatus 13 which is comprised of pulley 24 and weight 26.

Figure 3:
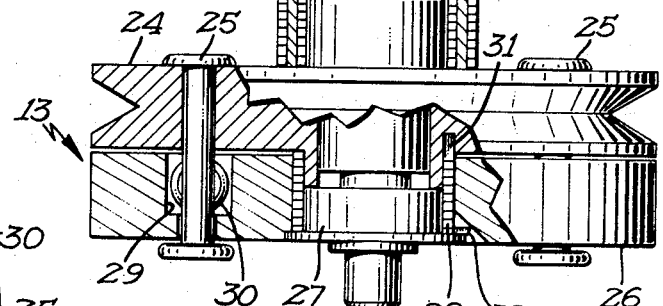
FIG. 3 is a sectional side view of the spindle drive assembly.

A sectional view of the spindle drive assembly is shown in FIG. 3. Retaining ring 23 and press-fitted hub 27 serve to retain clutch assembly 19 and braking assembly 13 in their desired position relative to shaft 22. One end of torsion spring 28 is seated in pulley aperture 31 and the other end is seated in weight 26 by means of notch 32.

It should be clear from FIG. 3 that relative motion between pulley 24 and weight 26 would cause either a contracting or an attempted expanding of torsion spring 28, depending on the orientation of torsion spring 28. Contracting of torsion spring 28 would have the effect of transmitting braking torque to shaft 22 through hub 27; expanding of torsion spring 28 would have no effect on shaft 22.

Figure 4:
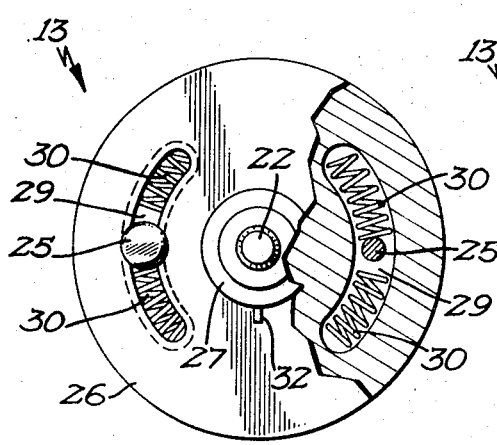
FIG. 4 is a partially sectional bottom view of the dynamic-braking apparatus.

FIG. 4 shows the secondary connection between pulley 24 and weight 25, that is, rivets 25. The limited range of relative motion between pulley 24 and weight 26 is shown by the length of weight slot 29. This illustrates a limitation on the amount of braking torque that torsion spring 28 is allowed to transmit to shaft 22. Compression springs 30 are provided within weight slot 29 to further limit the applied braking torque, provide an additional spring force impetus to return the pulley-weight combination to an equilibrium state, and to prevent noise due to contact between rivets 25 and portions of weight slot 29.

OPERATION

With reference to FIG. 3, the operation can be simply outlined. The drive mechanism shown in FIG. 3 is for rotating the supply reel in a counterclockwise direction. This is done in a rewind mode and for purposes of this illustration it must be assumed that the takeup reel is being powdered and the supply reel is being pulled and is the lagging reel. Under those circumstances, the clutch mechanism 19 disengages shaft 22 from pulley 24. This enables the lagging reel to freely rotate at the speed of the leading reel. However if the leading reel is suddenly stopped, no problem exists with it since its pulley is connected to its shaft by reason of the clutch mechanism. However, the situation is different with respect to the lagging reel. Pulley 24, because it is belt connected to the pulley of the leading reel, stops immediately. Shaft 22 tends to keep turning in a clockwise direction. Weight 26 also moves in a clockwise direction, but is connected to pulley 24, which is stopped by torsion spring 28. This causes torsion spring 28 to contract and to grip hub 27 Hub 27 is press-fitted to shaft 22, thereby transmitting the stopping torque to shaft 22 and to the lagging reel.

Reference should also be made to FIG. 4. Rivets are slidably mounted in weight 26 and are rigidly mounted in the pulley 24. When the weight moves clockwise with respect to the pulley, the rivets 25 bear against the torsion springs 30, easing the abruptness of the contraction of torsion spring 28. The springs 30 serve to bring the weight 26 back to a generally central position and also serve to prevent weight 26 from becoming "-noise," and to prevent weight 26 from vibrating.

Those skilled in the art realize that the dynamic brake is not limited to, but is for use in any film or tape handling apparatus This invention is not intended to be limited by the preferred embodiment.

We claim:

1. A dynamic-braking apparatus for providing braking torque to a rotating shaft, comprising:
   a. means for receiving braking torque,
   b. at least one weight having inertial resistance to the braking torque, and
   c. at least one torsion spring having a coil surround the rotating shaft with one end connected to the receiving means and the other end connected to the weight so that when the braking torque is applied, the weight exerts its inertial resistance, moving with respect to the receiving means, thereby causing the torsion spring to contract, transmitting the braking torque to the shaft.

2. The apparatus of claim 1 wherein the means for receiving braking torque comprising a pulley.

3. The apparatus of claim 2 further comprising:
   a. connecting means, slidably mounted in the weight and rigidly mounted in the pulley.

4. The apparatus of claim 3 wherein the weight having a slot in which the connecting means can slidably move is provided further with at least one compression spring against which the connecting means bears, slowing the application of the braking torque through the torsion spring.

* * * * *